(12) United States Patent
Steinberger (10) Patent No.: US 10,700,464 B2
(45) Date of Patent: Jun. 30, 2020

(54) DEVICE FOR A BUSBAR SYSTEM (71) Applicant: Woehner GmbH & Co. KG Elektrotechnische Systeme, Roedental (DE)

(72) Inventor: Philipp Steinberger, Coburg (DE)

(73) Assignee: WOEHNER GMBH & CO., KG ELEKTROTECHNISCHE SYSTEME, Roedental (DE)

( * ) Notice: Subject to any disclaimer, the term of this patent is extended or adjusted under 35 U.S.C. 154(b) by 0 days.

(21) Appl. No.: 16/099,859

(22) PCT Filed: May 16, 2017

(86) PCT No.: PCT/EP2017/061668
§ 371 (c)(1),
(2) Date: Nov. 8, 2018

(87) PCT Pub. No.: WO2017/198642
PCT Pub. Date: Nov. 23, 2017

(65) Prior Publication Data
US 2019/0115676 A1 Apr. 18, 2019

(30) Foreign Application Priority Data

May 17, 2016 (EP) ..................................... 16169977
Jan. 27, 2017 (EP) ..................................... 17153517

(51) Int. Cl.
*H01R 25/00* (2006.01)
*H01R 13/447* (2006.01)
(Continued)

(52) U.S. Cl.
CPC ......... *H01R 13/447* (2013.01); *H01R 9/2458* (2013.01); *H01R 9/28* (2013.01);
(Continued)

(58) Field of Classification Search
CPC ...... H01R 9/2458; H01R 9/28; H01R 13/447; H01R 12/592; H01R 43/20; H01R 4/026;
(Continued)

(56) References Cited

U.S. PATENT DOCUMENTS 3,009,011 A   11/1961   Fisher
3,018,320 A    1/1962   Rowe
(Continued)

FOREIGN PATENT DOCUMENTS

CN    1751422 A    3/2006
CN  102570317 A    7/2012
(Continued)

OTHER PUBLICATIONS

International Search Report corresponding to International Appl. No. PCT/EP2017/061668, dated Jul. 6, 2017, (11 pages).
(Continued)

*Primary Examiner* — Jean F Duverne
(74) *Attorney, Agent, or Firm* — Maginot, Moore & Beck, LLP (57) ABSTRACT

Device for a busbar system, wherein a housing of the device comprises, on one housing side, electrical connection contacts which are configured in such a way that they are passable through feed-through openings of a contact protection baseplate module of the busbar system and are insertable into uniformly spaced contact openings located below the feed-through openings of busbar modules provided inside the baseplate module for producing a direct electrical and mechanical connection to the busbar modules.

17 Claims, 7 Drawing Sheets

(51) Int. Cl.

| | | |
|---|---|---|
| *H01R 9/28* | (2006.01) | |
| *H02B 1/052* | (2006.01) | |
| *H02B 1/056* | (2006.01) | |
| *H01R 13/506* | (2006.01) | |
| *H01R 25/16* | (2006.01) | |
| *H01R 9/24* | (2006.01) | |
| *H02B 1/044* | (2006.01) | |
| *H01R 13/66* | (2006.01) | |

(52) U.S. Cl.
CPC ......... *H01R 13/506* (2013.01); *H01R 25/162* (2013.01); *H02B 1/044* (2013.01); *H02B 1/052* (2013.01); *H02B 1/056* (2013.01); *H02B 1/0523* (2013.01); *H01R 13/6691* (2013.01)

(58) Field of Classification Search
CPC ........ H01R 13/64; H02B 1/044; H02B 1/056; H02B 1/0523; B60R 16/027
USPC .......................................................... 439/121
See application file for complete search history.

(56) References Cited

U.S. PATENT DOCUMENTS

| | | | |
|---|---|---|---|
| 3,096,131 A | 7/1963 | Adams | |
| 3,182,381 A | 5/1965 | Johnston et al. | |
| 3,183,299 A | 5/1965 | Johnston et al. | |
| 3,213,403 A | 10/1965 | Hermann et al. | |
| 3,268,848 A | 8/1966 | Adams et al. | |
| 3,346,776 A | 10/1967 | Olashaw | |
| 3,634,810 A | 1/1972 | Pemberton | |
| 4,567,654 A | 2/1986 | Kloenne et al. | |
| 5,597,326 A * | 1/1997 | DeLessert | H01R 12/79 439/607.08 |
| 5,906,044 A * | 5/1999 | Fujii | B23K 20/10 29/860 |
| 5,938,462 A * | 8/1999 | Wilson | H01R 13/64 439/215 |
| 5,962,813 A * | 10/1999 | Shirako | H01R 4/026 174/88 R |
| 6,123,562 A * | 9/2000 | King | H02G 3/288 439/211 |
| 6,163,958 A * | 12/2000 | Suzuki | H01R 43/01 29/33 M |
| 6,437,250 B2 * | 8/2002 | Sugata | B60R 16/027 174/135 |
| 6,539,617 B2 * | 4/2003 | Abe | H01R 43/20 29/742 |
| 7,219,423 B2 * | 5/2007 | Johnson | H01R 12/592 174/88 R |
| 2004/0103531 A1* | 6/2004 | Shirakawa | H01R 43/20 29/857 |
| 2006/0121796 A1 | 6/2006 | Josten et al. | |
| 2007/0228826 A1 | 10/2007 | Jordan et al. | |

FOREIGN PATENT DOCUMENTS

| | | |
|---|---|---|
| CN | 104682071 A | 6/2015 |
| DE | 3424482 A1 | 1/1986 |
| DE | 3933703 A1 | 4/1991 |
| DE | 69010755 T2 | 12/1994 |
| DE | 4327715 A1 | 2/1995 |
| DE | 295 05 258 U1 | 8/1995 |
| DE | 295 05 243 U1 | 9/1996 |
| DE | 19511350 A1 | 10/1996 |
| DE | 19957277 A1 | 5/2001 |
| DE | 102013103544 | 10/2014 |
| DE | 202015106673 | 2/2016 |
| EP | 0 345 851 A1 | 12/1989 |
| EP | 1337005 A1 | 8/2003 |
| EP | 1351336 A1 | 10/2003 |
| EP | 1672743 A1 | 6/2006 |
| EP | 1742315 A1 | 1/2007 |
| EP | 1764872 A2 | 3/2007 |
| EP | 2 461 440 A2 | 6/2012 |
| EP | 2 863 496 A1 | 4/2015 |
| JP | S62 15795 U | 1/1987 |
| WO | 2004057716 A1 | 7/2004 |
| WO | 2004073127 A1 | 8/2004 |
| WO | 2013054873 A1 | 4/2013 |

OTHER PUBLICATIONS

International Search Report corresponding to International Appl. No. PCT/EP2017/061675, dated Aug. 1, 2017, (11 pages).
International Search Report corresponding to International Appl. No. PCT/EP2017/060826, dated Dec. 19, 2017, (11 pages).

* cited by examiner

DEVICE FOR A BUSBAR SYSTEM

This application is a 35 U.S.C. 371 National Stage application of PCT/EP2017/061668, filed May 16, 2017, and claims priority to European Application No. EP 16169977.2, filed on May 17, 2016 and European Application No. EP 17153517.2, filed on Jan. 27, 2017. The entire contents of the above-mentioned patent applications are incorporated herein by reference as part of the disclosure of this U.S. application.

The invention relates to a device for a busbar system which is connectable to the busbar system by means of a contact protection integrated baseplate module.

A busbar system may include one or more busbars for supplying power to electrical devices. Conventional busbar systems use busbars with a rectangular cross-section for power transmission. Such busbars may, for example, be mounted inside switch cabinets and are used for single-phase or multi-phase power supply systems. For multi-phase power supply, busbars are conventionally arranged in parallel to each other, with switching devices being placed on the parallel busbars by means of latching elements or adapter devices. With conventional busbar systems, it is necessary to make the current-carrying busbars contact-protected for a user at points where no switching device is mounted on the busbars by means of protection covers. With conventional busbar systems, a user therefore is confronted with a considerable amount of installation work, since not only the switching device has to be mounted on the busbars, but also additional electrically insulating cover elements have to be attached to the busbars to protect the user.

In conventional busbar systems, different devices may be mounted on the busbar system. Such devices include, for example, protection switching devices, motor-protection circuit-breakers or the like. These are usually mounted by using a so-called adapter part, which is placed on the busbars as a completely separate element. The adapter part serves on the one hand to clamp onto the busbars and on the other hand as a mounting module for the different devices. The electrical connection between the busbars on the one hand and the respective device on the other hand is made by connecting the contact parts to the respective electrical device by means of connecting lines. The disadvantage here is that the adapter or adapter part has to be attached to the busbars as an additional component and be provided with connecting lines or connecting contacts. The devices also have to be mounted on the adapter as separate components and brought into electrical contact with connecting lines or connecting contacts. If a device is replaced or removed, it is therefore necessary to remove the outgoing lines from the respective device and then to reconnect them. In addition, the device has to be detached from the adapter part before removal, and the newly replaced device has to be fastened after replacement. If necessary, the busbars of the busbar system even have to be de-energized for mounting and/or removing of a device.

It is therefore an object of the present invention to provide a device for a busbar system that on the one hand allows simple mounting and removing of the device and on the other hand provides a high degree of contact protection for the user.

In accordance with the invention, this object is achieved by a device for a busbar system with the features defined in claim 1.

The invention therefore provides a device for a busbar system, wherein a housing of the device comprises electrical connection contacts on one housing side which are formed in such a way that they are passable through feed-through openings of a baseplate module of the busbar system which is contact protected, and are insertable into contact openings, uniformly spaced and arranged below the feed-through openings, of busbar modules provided within the contact protection baseplate module for producing a direct electrical and mechanical connection with the busbar modules.

In a possible embodiment of the device in accordance to the invention, additional latching means are attached to the housing of the device, which may be latched onto a cover plate of the base plate module and/or into latching webs of the contact protection base plate module running in parallel to the busbar modules.

In another possible embodiment of the device in accordance to the invention, the device is an electrical, electronic or electromechanical device to which power is supplied by means of the electrically connected busbar modules and/or communicates with other devices of the busbar system by means of the electrically connected busbar modules.

In another possible embodiment of the device in accordance to the invention, the housing of the device is provided with corresponding contact protection ribs for the electrical connection contacts, which run parallel to each other.

In another possible embodiment of the device in accordance to the invention, the housing of the device is provided with reverse polarity protection ribs for a correct connection to the busbar system.

In another possible embodiment of the device in accordance to the invention, the connection contacts of the device are V-shaped or finger-shaped and may be passed through slot-shaped feed-through openings of a cover plate of the base plate module and inserted into the contact openings below.

In another possible embodiment of the device in accordance to the invention, the housing of the device comprises an integrally formed web to which a mounting rail or top-hat rail is attached.

In another possible embodiment of the device in accordance to the invention, the device comprises first electrical connection contacts for the power supply of the device and second electrical connection contacts for communication with other devices of the busbar system.

In another possible embodiment of the device in accordance to the invention, the device comprises an integrated transceiver which is configured to exchange information data with other devices of the busbar system by means of Powerline Communication, PLC, by means of the connection contacts of the device inserted into the busbar modules or by means of a radio interface.

In a possible embodiment of the device in accordance to the invention, the device is a motor control unit.

In another possible embodiment of the device in accordance to the invention, the device is a measuring device.

In another possible embodiment of the device in accordance to the invention, the device is a display device.

In another possible embodiment of the device in accordance to the invention, the device is a power supply unit.

In another possible embodiment of the device in accordance to the invention, the device is a fuse holder device.

In another possible embodiment of the device in accordance to the invention, the device is a switch disconnector.

In another possible embodiment of the device in accordance to the invention, the device is a fuse-switch disconnector.

In another possible embodiment of the device in accordance to the invention, the device is a surge protection device.

In another possible embodiment of the device in accordance to the invention, the device is a lightning protection device.

In another possible embodiment of the device in accordance to the invention, the device is a communication device.

In another possible embodiment of the device in accordance to the invention, the device is a residual current circuit breaker.

In another possible embodiment of the device in accordance to the invention, the device is an interference suppression device.

In the following, possible embodiments of the device in accordance to the invention for a busbar system are described in detail with reference to the attached figures.

Figure 1:
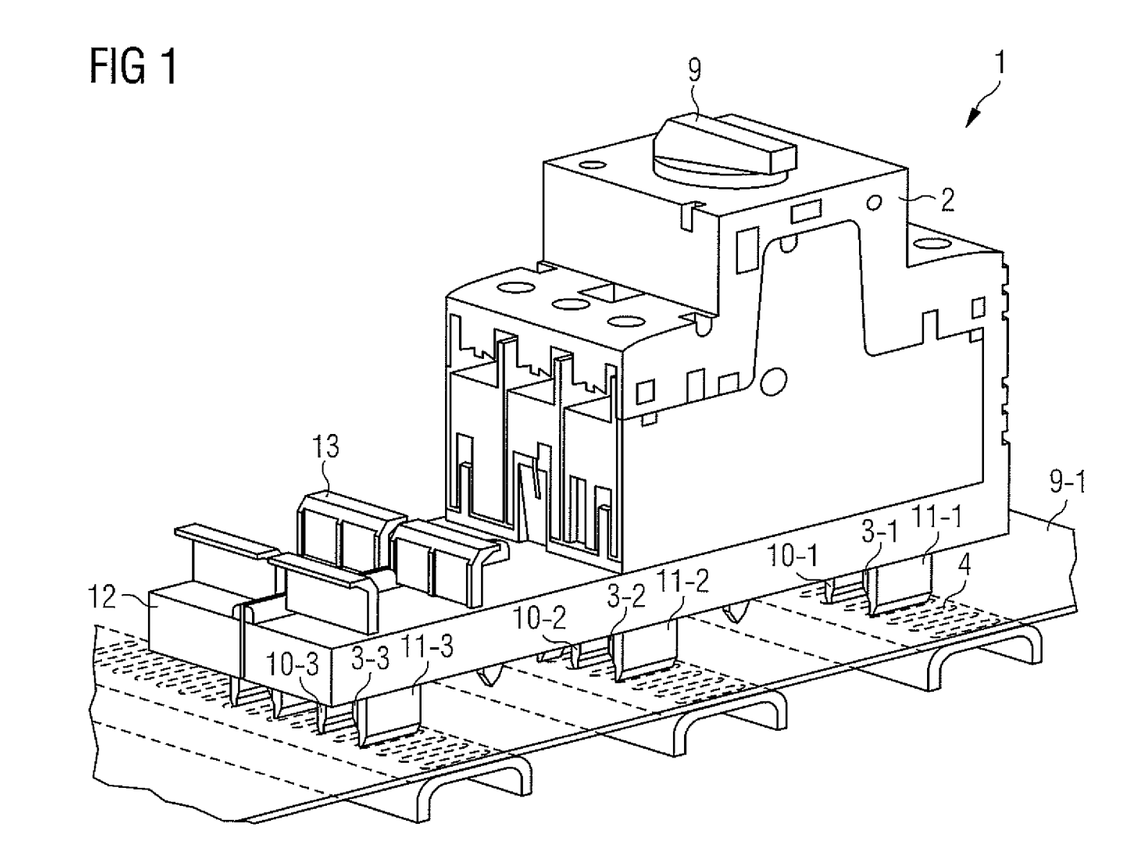
FIG. 1 is a view of the exemplary embodiment of a device in accordance to the invention for a busbar system.
Figure 2:
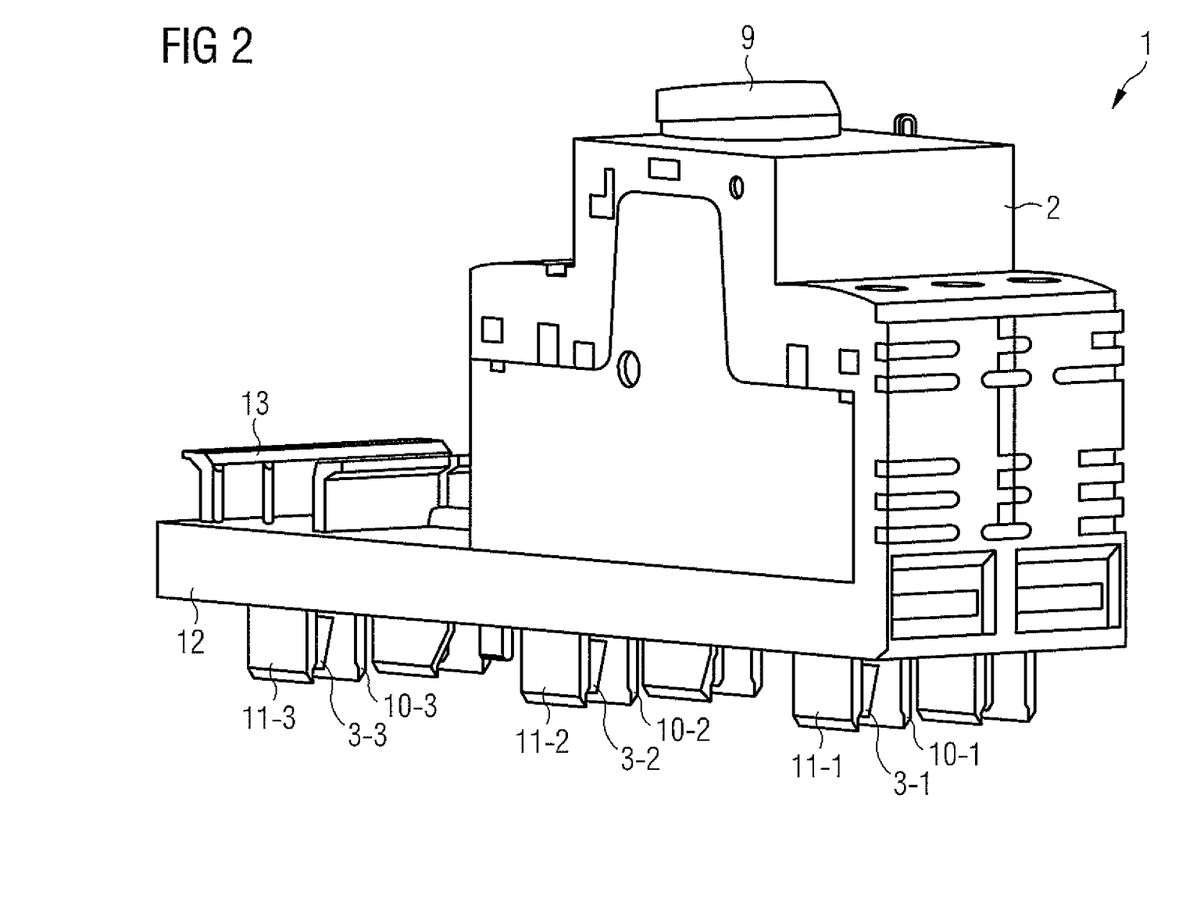
FIG. 2 is another view of the device shown in FIG. 1.

FIGS. 1 and 2 show perspective views of an exemplary embodiment of a device 1 according to the invention for a busbar system. In the exemplary embodiment shown in FIG. 1, reference numeral 2 indicates a motor control unit, in particular a motor starter. The device 1 shown in FIG. 1 comprises a housing 2 in which the electrical or electromechanical components or elements of device 1 are integrated. The housing 2 comprises electrical connection contacts 3 on its lower housing side, which are configured in such a way that they may be passed through feed-through openings 4 of a cover plate 5 of a contact protection base plate module 6 of the busbar system, and uniformly spaced contact openings 7 of busbar modules 8 provided within the base plate module 6, located below the feed-through openings 4, may be inserted in for producing a direct electrical and mechanical connection with the busbar modules 8. This is also shown schematically in FIG. 7.

Figure 3:
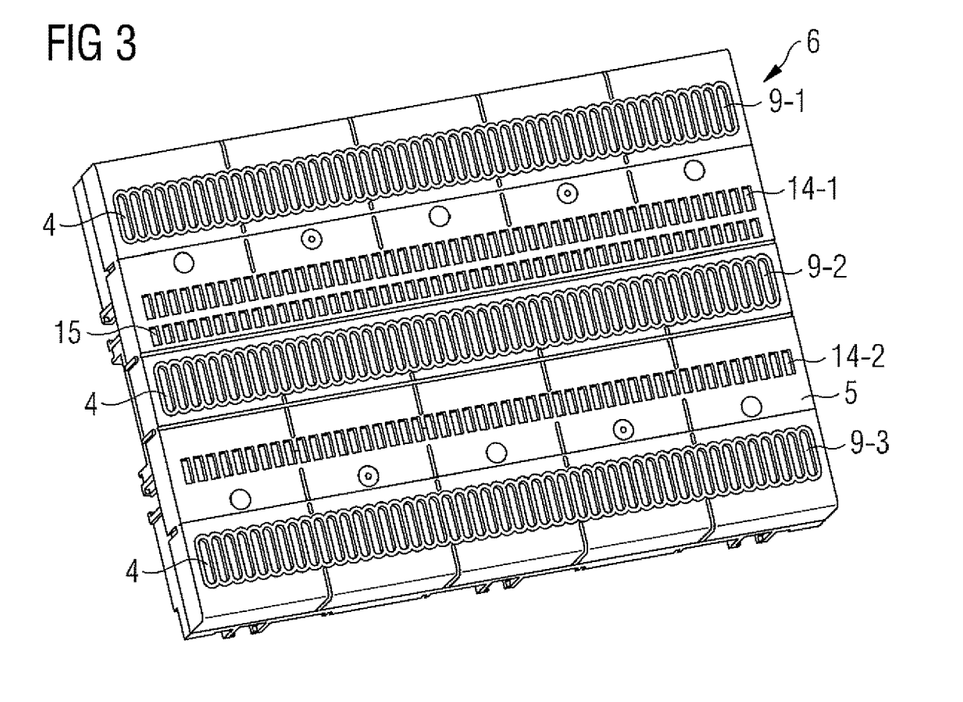
FIG. 3 is a perspective view of a possible embodiment of a contact protection base plate module used in the busbar system with a built-in cover module.
Figure 4:
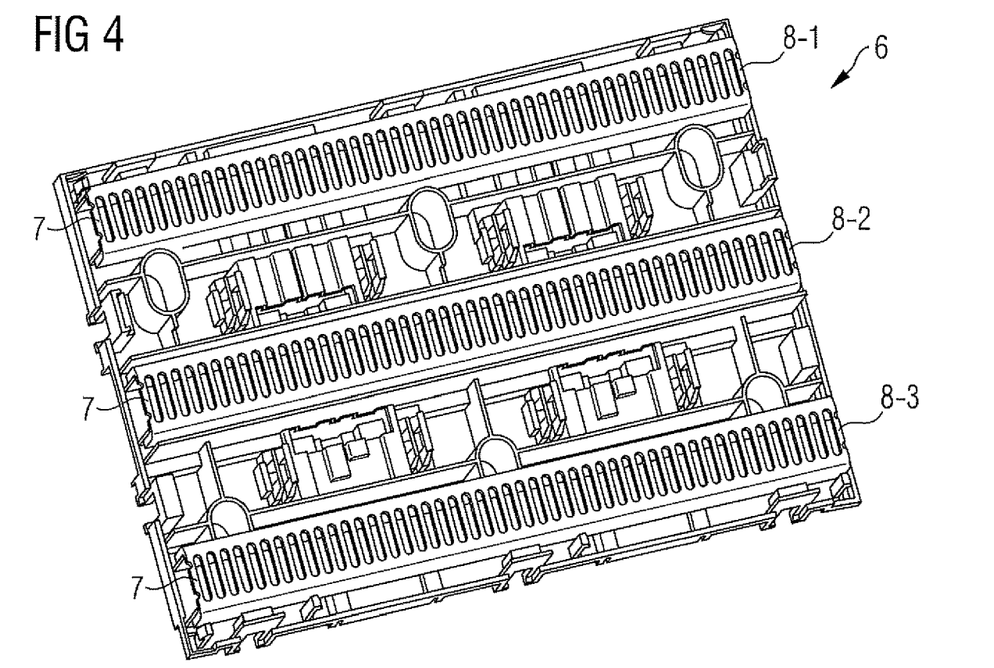
FIG. 4 shows the contact protection base plate module shown in FIG. 3 with the cover module removed.
Figure 7:
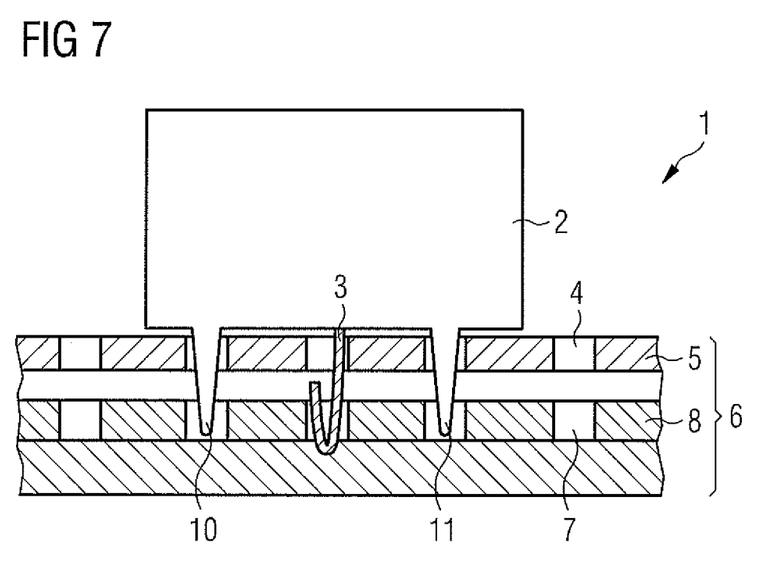
FIG. 7 schematically shows a sectional view of a device in accordance with the invention inserted in a baseplate module.

FIGS. 3, 4 show an exemplary embodiment of the baseplate module 6. FIG. 3 shows the baseplate module 6 with the cover plate 5 attached, while FIG. 4 shows the baseplate module 6 with the cover plate 5 removed. As can be seen in FIG. 4, in the example shown, there are three busbars 8-1, 8-2, 8-3 arranged in parallel for different current phases L within the base plate module 6. These different busbars 8-i each have uniformly spaced contact openings 7. In the example shown in FIG. 4, the contact openings 7 are contact slots which are uniformly spaced apart within the busbars 8 in a predetermined array. The cover plate 5 of the base plate module 6 comprises corresponding rows 9 1, 9-1, 9-3 of feed-through openings 4, corresponding to the three busbars 8-1, 8-2, 8-3 provided within the base plate module 6, which are also uniformly spaced from each other and are arranged above corresponding contact openings or contact slots 7, as schematically shown in FIG. 7.

The housing 2 of device 1 shown in FIG. 1 may have one or more control elements 9 on its upper side, for example a rotary switch or the like. For each row 9-i of feed-through openings 4 inside the cover plate 5 and for each row of contact openings 7 of busbars 8-i inside the base plate module 6, the housing 2 comprises at least one corresponding electrical contact 3-i on its underside, as shown in FIG. 1. For a base plate module 6, as shown in FIGS. 3, 4 in and without cover plate 5, the device 1 comprises three parallel electrical connection contacts 3-1, 3-2, 3-3, as shown in FIGS. 1, 2. The spacing between the electrical connection contacts 3-1, 3-2, 3-3 corresponds to the spacing between the feed-through openings 4 of the rows 9-1, 9-2, 9-3 or the spacing between the contact openings 7 below the feed-through openings of the corresponding busbars 8-1, 8-2, 8 provided within the base plate module 6. 3. The housing 2 of device 1 can also comprise several connection contacts 3-i for each busbar 8-i in a possible embodiment. In the exemplary embodiment shown in FIG. 1, housing 2 comprises two electrical connection contacts on the underside of the housing for each of the three busbars 8-1, 8-2, 8-3. The number of connection contacts 3-i of device 1 for each busbar 8-i can vary depending on the type of device 1. Device 1, the electrical, electronic or electromechanical components of which are integrated in housing 2, may be supplied with power by means of the electrically connected 8-i busbar modules of the base plate module 6. For example, three busbars 8-1, 8-2, 8-3 for three current phases L1, L2, L3 are provided within the base plate module 6.

In one possible embodiment, device 1 communicates with other devices in the busbar system by means of the electrically connected busbar modules 8-1, 8-2, 8-3. In one possible embodiment, the device 1 comprises first electrical connection contacts for the power supply of device 1 and second electrical connection contacts for communication with other devices of the busbar system. A preferred embodiment of the device 1 comprises a transceiver integrated in the housing 2, which is configured to exchange information data with other devices of the busbar system by means of Powerline Communication, PLC, by means of the connection contacts 3 of the device 1 which are inserted into the busbar modules 8-i.

In the case of a possible embodiment, the housing 2 of the device 1 is provided with corresponding parallel contact protection ribs for the 3-i electrical connection contacts. In the schematic diagram according to FIG. 7, two contact protection ribs 10, 11 are shown parallel to the electrical connection contact 3 of device 1. These contact protection ribs 10, 11 are also visible in FIGS. 1, 2. The electrical connection contact 3-1 provided for the first busbar 8-1 comprises two contact protection ribs 10-1, 11-1 arranged in parallel with it. Furthermore, the electrical connection contact 3-2 provided for the second busbar 8-2 comprises two contact protection ribs 10-2, 11-2 arranged in parallel with it. In the same way, the third electrical connection contact 3-3 of the device 1 comprises two contact protection ribs 10-3, 11-3 arranged in parallel with it for the third busbar 8-3. As shown in FIG. 7, a feed-through opening 4 is located within the cover plate 5 of the base plate module 6 directly above a corresponding contact opening 7 of a busbar 8. The spacing between the feed-through openings 4 corresponds exactly to the spacing between the various contact openings 7 within the busbar 8. The size and shape of the feed-through openings 4 also preferably correspond exactly to the size and shape of the contact openings 7 within the busbar modules 8. Preferably, the feed-through openings 4 and the contact openings 7 below are slot-shaped, as shown in FIGS. 3, 4.

The contact protection ribs 10, 11 provide a guide function in order to ensure that the housing 2 is placed in a targeted manner on the base plate module 6. The contact protection ribs 10, 11 also form a lateral mechanical protection of the connection contacts 3, especially if the housing 2 of the device 1 has been removed from the base plate module 6. The spacing between the lateral contact protection ribs 10, 11 and the intermediate electrical connection contact 3 preferably corresponds exactly to the spacing between two feed-through openings 4 within the cover plate 5 of the base plate module 6 or the spacing between two contact openings 7 within a busbar module 8, as shown in FIG. 7. The array of the electrical connection contacts 3 and the two corresponding contact protection ribs 10, 11 on the side thus corresponds to the array of the feed-through openings 4 in the cover plate 5 of the base plate module 6 and the array of the contact openings 7 within the busbar modules 8.

In the case of the exemplary embodiment shown in FIG. 7 and FIG. 1, the electrical connection contact 3 comprises two contact protection ribs 10, 11 arranged parallel to each other. In other possible embodiments, further contact protection ribs 10, 11 may be provided parallel in the corresponding array of the feed-through openings 4 or contact openings 7 in order to further facilitate the insertion of the contact openings 3 into the base plate module 6 and to increase the mechanical stability in the inserted condition. In the example shown in FIG. 7, the electrical connection contacts 3 are V-shaped so that they may be easily passed through the feed-through openings 4, and may then establish an electrical and mechanical connection with the underlying busbar modules 8 by inserting them into the contact openings 7 thereof.

Figure 6A:
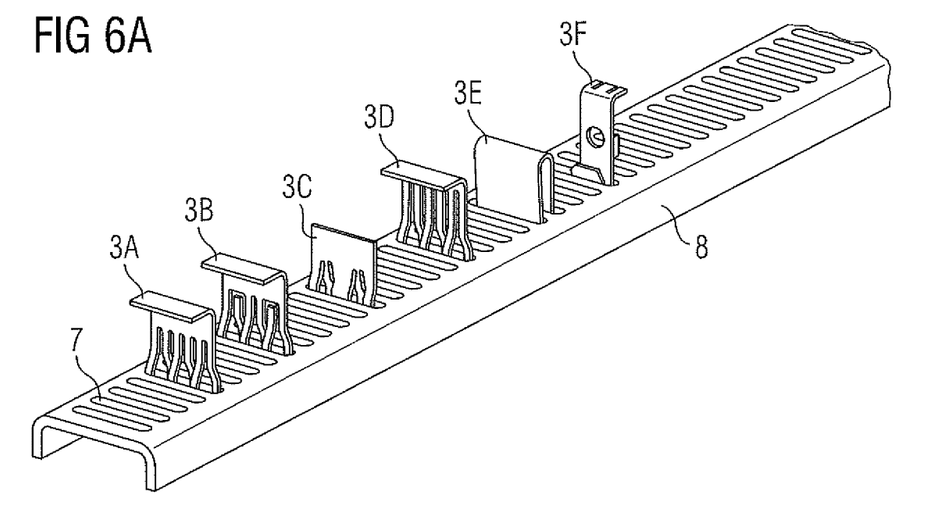
FIGS. 6A, B show various embodiments of electrical connection contacts, for use with the device in accordance with the invention.
Figure 6B:
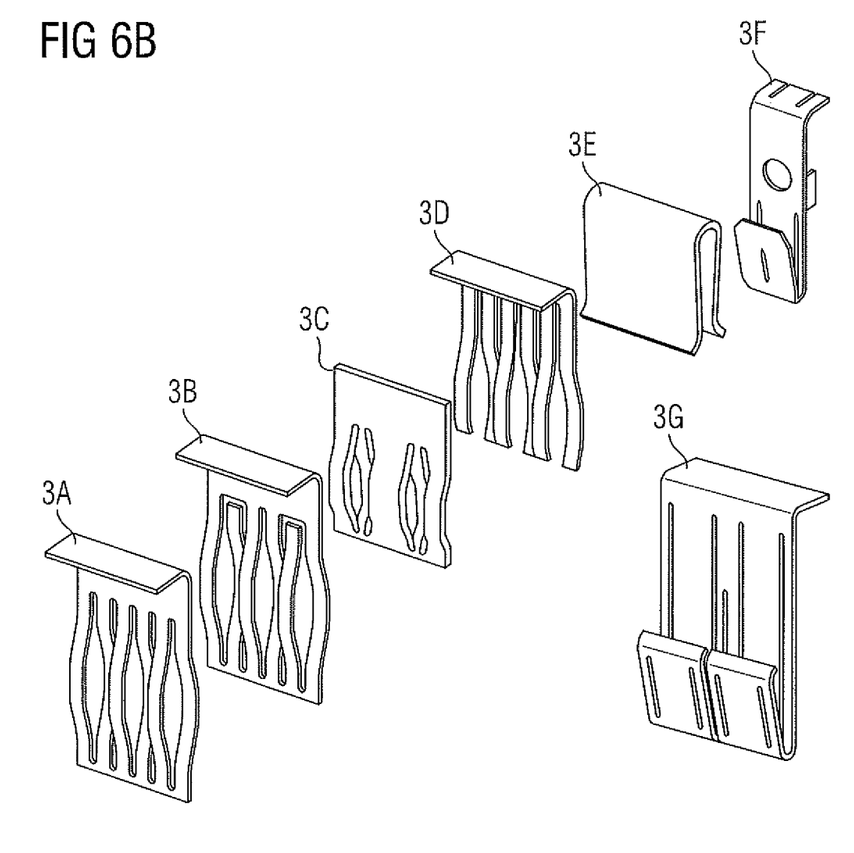

FIGS. 6A, 6B show various embodiments of electrical connection contacts 3 for connecting the electrical device 1 in contact openings or contact slots 7 of busbar modules 8-*i*. FIG. 6A shows six different embodiments 3A to 3F for possible electrical connection contacts 3, which may be inserted through feed-through openings 4, in particular feed-through slots, into the contact openings or contact slots 7 of a busbar module 8. FIG. 6B shows the different embodiments 3A to 3F of the electrical connection contacts 3-*i* according to FIG. 6A in the un-inserted condition. Furthermore, FIG. 6B shows a further embodiment 3G of a connection contact 3. The connection contacts 3 are preferably configured in such a way that they establish a mechanical connection with the corresponding busbar module 8 in addition to the electrical contact, as can be seen in FIG. 6A.

FIG. 7 shows schematically a device 1 with V-shaped connection contacts according to the embodiment 3G according to FIG. 6B. The various embodiments of the connection contacts 3 are preferably configured in such a way that a housing 2 of a device 1 may be inserted into corresponding busbar modules 8 and then be pulled out again if necessary. In an alternative embodiment, the electrical connection contacts 3 can also be mechanically configured in such a way that they latch into place after insertion into the busbar module 8 and the housing 2 can no longer simply be pulled out of the busbar module 8.

In a possible exemplary embodiment, additional latching means are attached to the housing 2 of the device 1, which may be latched onto the cover plate 5 of the base plate module 6 and/or into latching webs of the contact protection base plate module 6 running in parallel to the busbar modules 8. The connection contacts 3 shown in FIGS. 6A, 6B are preferably V-shaped, as shown in embodiments 3F, 3G, or finger-shaped, as shown in FIG. 3D. The connection contacts 3 may be passed through slot-shaped feed-through openings 4 of the cover plate 5 of the base plate module 6 and inserted into the contact openings 7 directly below.

As can be seen in FIG. 1, the housing 2 of device 1 comprises a molded-on web 12, on which a mounting rail or top-hat rail 13 may be attached. In the exemplary embodiment shown in FIG. 1, a top-hat rail 13 is provided on the web 12 of the housing 2, which makes it possible to mount further devices, for example a contactor or similar.

In the example shown in FIG. 1, a pair of connection contacts 3-*i* is provided for each busbar 8-*i* of the busbar system. In the exemplary embodiment shown in FIG. 1, the device 1 therefore comprises a total of six electrical connection contacts 3, whereby two electrical connection contacts are each provided for one of the three busbar modules 8-*i* of the busbar system. In one possible embodiment, one electrical contact 3 of the pair of contacts is used to supply power to device 1, and the adjacent second electrical contact 3 is used to communicate with other devices of the busbar system. In this way, the motor starter 1 shown in FIG. 1 can communicate with other various devices of the busbar system or exchange information data by means of the connection contacts 3 provided for this purpose. These various devices of the busbar system include, for example, a motor control unit, a measuring device, a display unit, a power supply unit, a securing device, a switch-disconnector, a fuse switch-disconnector, a surge protection device, a lightning protection device, a communication device, a residual current circuit breaker or an interference suppression device.

The contact protection base plate module 6 shown in FIG. 3 is composed of the cover plate 5 and a lower part, both of which are firmly connected to each other, in one possible embodiment. In a possible embodiment, the upper part or the cover plate 5 is clipped onto the lower part by means of clip connections. In an alternative embodiment, the upper part or the cover plate 5 is firmly screwed on to the lower part. Furthermore, the cover plate 5 may be firmly welded to the lower part. In another possible embodiment, the cover plate 5 is riveted or glued to the lower part of the contact protection base plate module 6. Each of the upper part or the cover plate 5 as well as the lower part consists of an electrically insulating material. In a preferred embodiment, the cover plate 5 and the lower part are made of flame-retardant plastic material. In a preferred embodiment, the electrically insulating flame-retardant plastic material of the upper part 5 and the lower part of the contact protection base plate module 6 comprises a relatively high thermal conductivity for dissipating heat. The housing 2 of device 1 preferably consists of an electrically insulating flame-retardant plastic material.

The electrical devices 1 may be mounted directly on the base plate module 6 without the need for adapter devices or the like. The devices or switching devices 1 each have a housing 2, on the underside of which preferably V-shaped or finger-shaped connection contacts 3 are attached. These connection contacts 3 are used to establish an electrical connection with the electrically conductive busbar modules 8 within the contact protection base plate module 6. The connection contacts 3 of the devices 1 are self-resilient in a possible embodiment. In another possible embodiment, the connection contacts 3 of device 1 are spring-loaded externally.

In the embodiment shown in FIG. 1, the front or cover plate 5 of the base plate module 6 comprises three rows 9-*i* of feed-through openings 4. The connection contacts 3 of device 1 are configured in such a way that they may be passed through the feed-through openings 4 of the cover plate 5 and, after being passed through, may be inserted into the correspondingly arranged contact openings 7 of a specified contact opening array of the electrically conductive busbar modules 8 enclosed by the insulating contact protection baseplate module 6. The electrically conductive busbar modules 8 are special busbar modules 8 with contact openings 7, which also comprise the specified contact opening array. In the embodiment shown in FIGS. 3, 4, the feed-through openings 4 and the contact openings 7 are slot-shaped. Alternatively, feed-through openings 4 and contact openings 7 may be circular, elliptical, square or triangular.

FIGS. 5A, 5B, 5C, 5D show various embodiments of electrically conductive busbar modules 8. In the embodiments according to FIGS. 5A to 5D, the contact openings 7 are slot-shaped and form contact slots. Corresponding connection contacts 3 of the device 1 in accordance to the invention are inserted into these in order to establish an electrical and mechanical connection. The feed-through openings 4 and the contact openings 7 have a specified spacing of 4.5 mm for a possible exemplary embodiment and may preferably be 2.2 mm wide. The feed-through openings 4 and contact openings 7 are contact slots in a possible embodiment and have a slot length of approx. 15 mm in a possible embodiment. Other dimensions and spacing of the feed-through openings 4 and the contact openings 7 are also possible in an alternative embodiment. The dimensions and spacing of the connection contacts 3 of the device 1 may also vary accordingly.

Figure 5A:
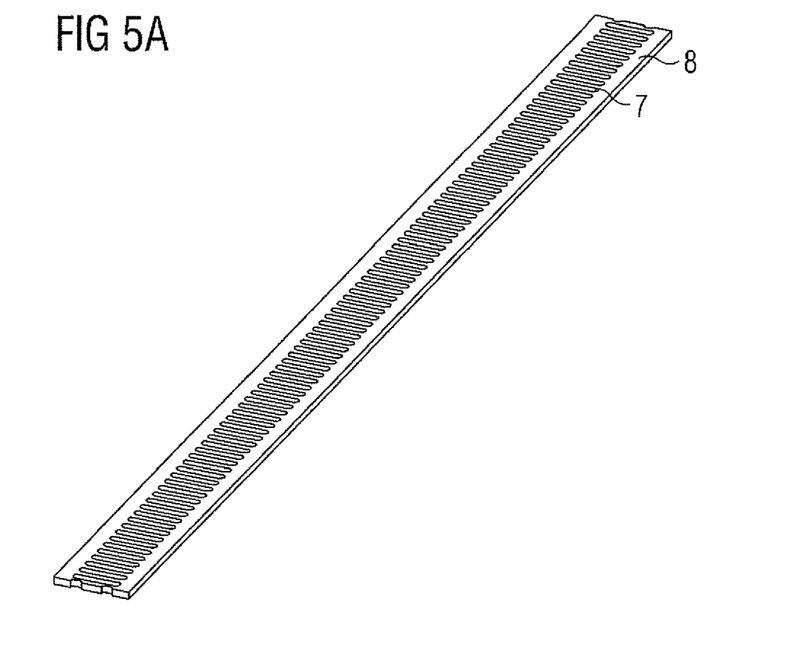
FIGS. 5A, B, C, D show various embodiments for possible busbar modules for use with the busbar system.
Figure 5B:
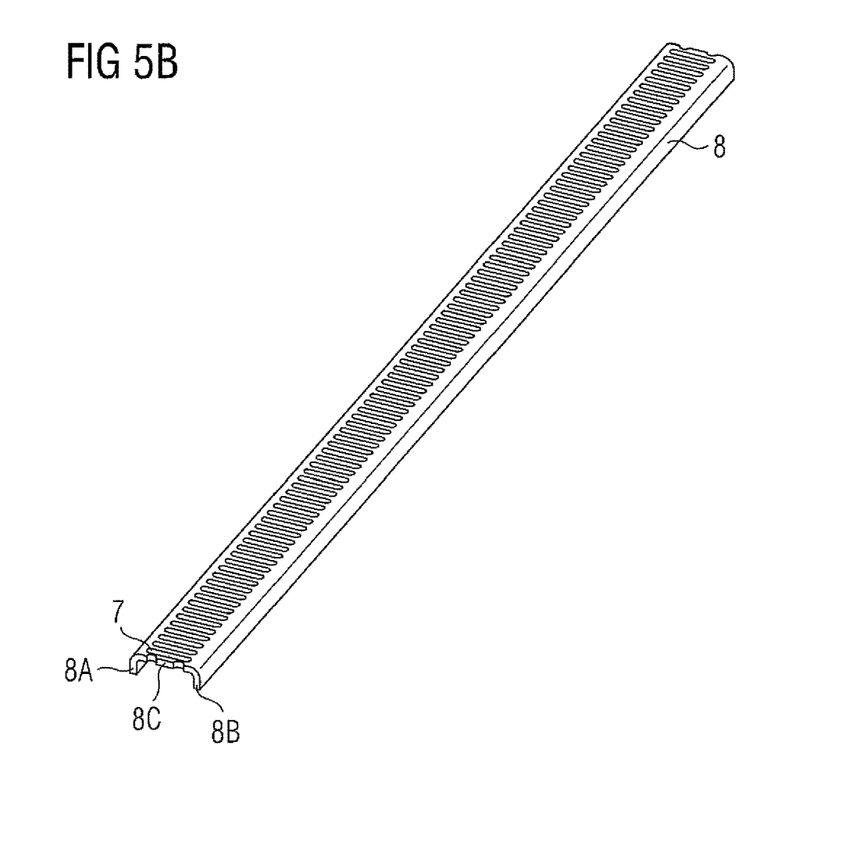
Figure 5C:
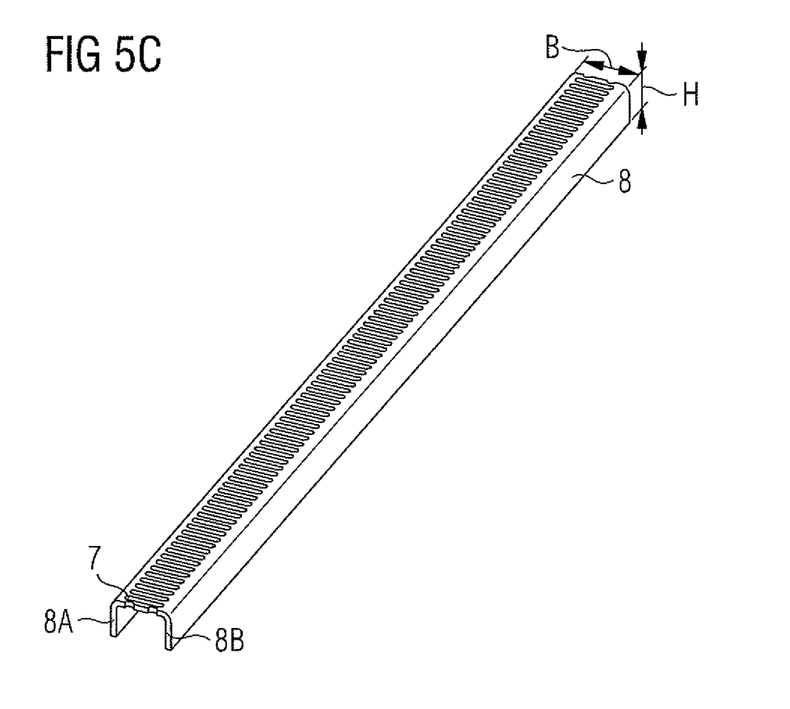
Figure 5D:
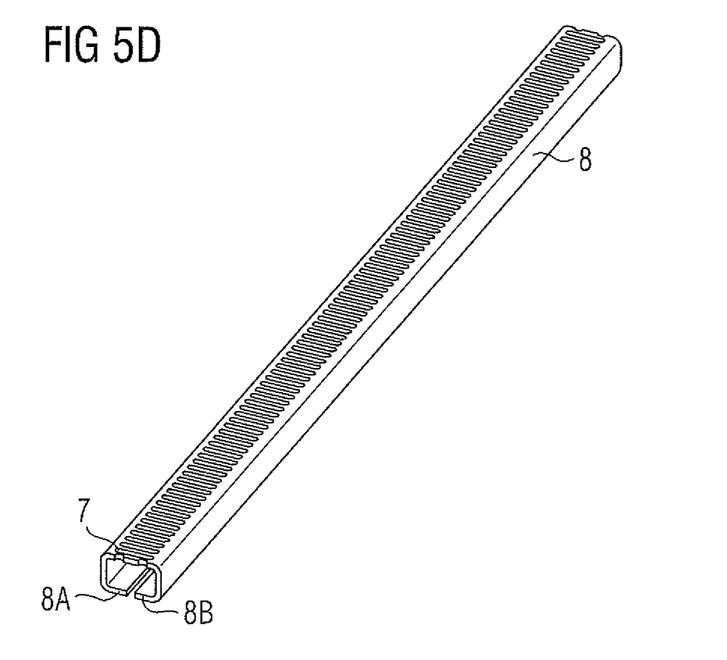

In the embodiment shown in FIG. 5A, the electrically conductive busbar module 8 is flat. In the embodiments shown in FIGS. 5B, 5C and 5D, the busbar modules 8 have a U-shaped or O-shaped cross section.

In the embodiment shown in FIGS. 3, 4, the contact protection baseplate module 6 comprises two rows 14-1, 14-2 with contours or slots which are intended to accommodate latches of the installed devices 1. These latches can secure the units 1 against being pulled forward. The contact protection ribs 10, 11 secure the device 1 in direction of gravity. In addition, the embodiment shown in FIG. 3 comprises a further row of 15 contours or slots into which the polarity reversal protection ribs of the connected devices 1 may be engaged. The reverse polarity protection ribs are located on the underside of the housing 2 of device 1 shown in FIGS. 1, 2. The contours or slots of row 15 within the upper part 5 of the contact protection base plate module 6 prevent electrical devices 1 from being inserted into the contact protection base plate module 6 incorrectly or in the wrong orientation. Due to the particular arrangement of the various feed-through slots 4 of the latching contours and the reverse polarity protection contours for the reverse polarity protection ribs of devices 1, the entire contact protection base plate module 6 may be fitted with electrical devices 1 without losing any mounting space on the left or right side. The devices 1 can preferably be lined up without any gap between them on the contact protection baseplate module 6, so that no free space remains on the front or front-side of the contact protection baseplate module 6 i.e. without losing any space. The contact protection base plate module 6 provides IP20 protection against accidental contact in one possible embodiment. The row of coding and polarity reversal protection ribs also reliably prevents accidental twisting of connected devices 1. The devices 1 may be connected to and disconnected from the busbar system without the use of tools. A slotted screwdriver may only be used to operate a latching element of device 1.

In one possible embodiment, the devices 1 of the busbar system communicate with each other by means of Powerline Communication, PLC, by means of the busbars 8 contained in the contact protection baseplate module 6. The devices 1 each have a transceiver for exchanging information data by means of associated connection contacts 3. Preferably, a frequency range from 50 to 500 kHz and/or from 16 MHz to 30 MHz is used for data transmission. Data rates of up to 2.5 Mbit/sec may be achieved in the lower frequency range, while up to 14 Mbit/sec may be achieved in the upper frequency range. In another possible embodiment of the busbar system, the devices 1 connected to the busbar system communicate with each other by means of a separate wireless radio interface.

In the case of another possible exemplary embodiment of device 1 in accordance with the invention, communication between device 1 and other devices 1 is performed by means of various communication channels, in particular by means of electrical data lines, Powerline Communication and/or wireless communication by means of radio interfaces. These radio interfaces include a WLAN, a Bluetooth, a ZigBee or an RFID interface for a possible exemplary embodiment. In particular, using a radio interface, device 1 can also communicate by means of an external transmitter and receiver, such as a smartphone, in order to exchange and set data and parameters. In another possible embodiment, the contact protection baseplate module 6 comprises additional modules for neutral conductor N or PE conductor or may be extended for data lines. In this embodiment, the device 1 comprises corresponding connection contact for connection to the neutral conductor N and/or to the PE conductor of the additional module.

The device in accordance to the invention 1 may be attached to the busbar system quickly and with relatively little effort. Assembly is carried out without the use of any tools. The contact protection base plate module 6 provides almost complete protection against accidental contact for the user. Furthermore, the device 1 shown in FIG. 1 may be quickly and safely removed from the mounting plate or the contact protection base plate module 6, if required, without having to disconnect the busbar modules 8-$i$ from the current supply or voltage supply. The contact resistance between the electrical device 1 and the busbars 8-$i$ is very low, so that the resulting power loss is also minimal. The busbars 8-$i$ are not only used for the current supply or voltage supply of the connected devices 1, but are also used for the communication between the different devices 1 at the same time. The contact protection base plate module 6 is configured for a preferred embodiment in a switch cabinet, whereby the rows of feed-through openings 4 and the corresponding rows of contact openings 7 run horizontally inside the switch cabinet. In the non-installed condition of device 1, the contact protection ribs 10, 11 serve to protect the intermediate connection contacts 3, for example against bending or other mechanical damage. In the installed condition of device 1, i.e. after insertion into the base plate module 6, the contact protection ribs 10, 11 provide a mechanical holding force against gravity. In addition, the electrical connection contacts 3 also establish a mechanical connection with the busbar modules 8.

The invention claimed is:

1. A device for a busbar system, wherein a housing of the device comprises electrical connection contacts on a housing side which are configured such that they are passable through feed-through openings of a contact protection base plate module of the busbar system and are insertable into uniformly spaced contact openings of busbar modules located below the feed-through openings provided inside the base plate module for producing a direct electrical and mechanical connection to the busbar modules, wherein associated contact protection ribs running in parallel thereto are provided on the housing of the device for the electrical connection contacts, and wherein the spacing between two lateral contact protection ribs and the associated electrical connection contact arranged therebetween corresponds to the spacing between two feed-through openings within the cover plate of the baseplate module or the spacing between two feed-through openings within the cover plate of the baseplate module corresponds to the spacing between two contact openings within a busbar module, such that an array of the electrical connection contacts and the two lateral associated contact protection ribs corresponds to the array of the feed-through openings within the cover plate of the base plate module and to the array of the contact openings within the busbar modules.

2. The device according to claim 1, wherein the device is an electrical, electronic or electromechanical device which is supplied with power by means of the electrically connected busbar modules, and/or communicates with other devices of the busbar system by means of the electrically connected busbar modules.

3. The device according to claim 1, wherein the connection contacts of the device are V-shaped or finger-shaped and are each passable through slot-shaped feed-through openings of a cover plate of the base plate module and are insertable into the underlying contact openings.

4. The device according to claim 1, wherein the housing of the device comprises an integrally formed web to which a mounting or top-hat rail is attached.

5. The device according to claim 1, wherein the device comprises first electrical connection contacts for supplying power to the device and second electrical connection contacts for communicating with other devices of the busbar system.

6. The device according to claim 1, wherein the device comprises an integrated transceiver which is configured to exchange information data with other devices of the busbar system by means of Powerline Communication by means of the connection contacts of the device which are inserted into the busbar modules, or by means of a radio interface.

7. The device according to claim 1, wherein the device comprises:
   a motor control unit,
   a measuring device,
   a display device,
   a power supply,
   a securing device,
   a switch disconnector,
   a fuse-switch disconnector,
   a surge protection device,
   a lightning protection device,
   a communication device,
   a residual current circuit breaker, and
   an interference suppression device.

8. The device according to claim 1, wherein further contact protection ribs are provided in parallel in the corresponding array of the feed-through openings or contact openings.

9. The device according to claim 1, wherein polarity reversal protection ribs for a correct connection to the busbar system are provided on the housing of the device.

10. A device for a busbar system, wherein a housing of the device comprises electrical connection contacts on a housing side which are configured such that they are passable through feed-through openings of a contact protection base plate module of the busbar system and are insertable into uniformly spaced contact openings of busbar modules located below the feed-through openings provided inside the base plate module for producing a direct electrical and mechanical connection to the busbar modules, and latching means are additionally attached to the housing of the device, which are latchable onto a cover plate of the base plate module and/or into latching webs of the contact protection base plate module running in parallel to the busbar modules.

11. The device according to claim 10, wherein the device is an electrical, electronic or electromechanical device which is supplied with power by means of the electrically connected busbar modules, and/or communicates with other devices of the busbar system by means of the electrically connected busbar modules.

12. The device according to claim 10, wherein associated contact protection ribs running in parallel thereto are provided on the housing of the device for the electrical connection contacts.

13. The device according to claim 12, wherein the spacing between two lateral contact protection ribs and the associated electrical connection contact arranged therebetween corresponds to the spacing between two feed-through openings within the cover plate of the baseplate module or the spacing between two feed-through openings within the cover plate of the baseplate module corresponds to the spacing between two contact openings within a busbar module, such that an array of the electrical connection contacts and the two lateral associated contact protection ribs corresponds to the array of the feed-through openings within the cover plate of the base plate module and to the array of the contact openings within the busbar modules.

14. The device according to claim 10, wherein polarity reversal protection ribs for a correct connection to the busbar system are provided on the housing of the device.

15. A device for a busbar system, wherein a housing of the device comprises electrical connection contacts on a housing side which are configured such that they are passable through feed-through openings of a contact protection base plate module of the busbar system and are insertable into uniformly spaced contact openings of busbar modules located below the feed-through openings provided inside the base plate module for producing a direct electrical and mechanical connection to the busbar modules, and polarity reversal protection ribs for a correct connection to the busbar system are provided on the housing of the device.

16. The device according to claim 15, wherein associated contact protection ribs running in parallel thereto are provided on the housing of the device for the electrical connection contacts.

17. The device according to claim 16, wherein the spacing between two lateral contact protection ribs and the associated electrical connection contact arranged therebetween corresponds to the spacing between two feed-through openings within the cover plate of the baseplate module or the spacing between two feed-through openings within the cover plate of the baseplate module corresponds to the spacing between two contact openings within a busbar module, such that an array of the electrical connection contacts and the two lateral associated contact protection ribs corresponds to the array of the feed-through openings within the cover plate of the base plate module and to the array of the contact openings within the busbar modules.

* * * * *